May 10, 1955     B. WALKER     2,708,098
RAMP JACK
Filed Nov. 20, 1950
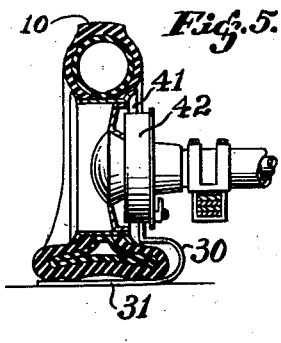
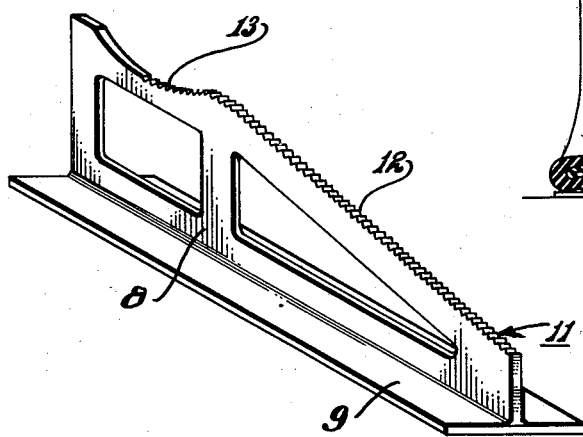
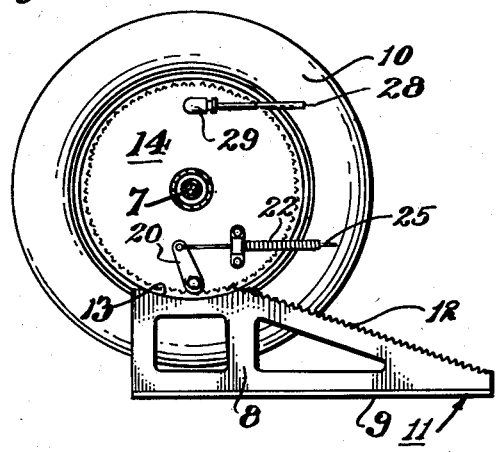
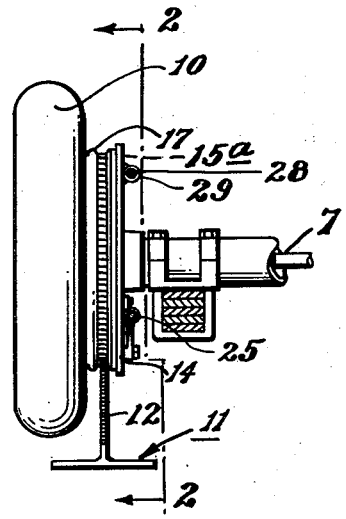
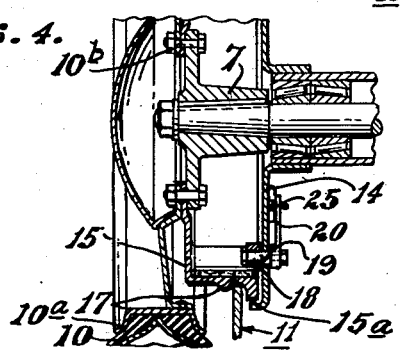
INVENTOR.
Brooks Walker

United States Patent Office 2,708,098
Patented May 10, 1955

2,708,098
RAMP JACK
Brooks Walker, Piedmont, Calif.

Application November 20, 1950, Serial No. 196,647

2 Claims. (Cl. 254—88)

This invention pertains to a ramp type jack for motor vehicles and the like. It is equally adaptable to airplanes, trailers, and other types of wheeled vehicles where power to move or to rotate the wheels is available from some other source, or even from manual power.

The invention, in general, pertains to using the brake drum, an inside extension of the wheel, the inside of the tire rim, a projection of the brake drum or auxiliary rim over the brake drum, so adapted to receive an inclined edge of a ramp type jack in such a way that when the wheel is rotated in contact with the jack, the wheel is raised up the incline and reaches a recess to provide stability for the raised wheel and axle when it has reached the desired height. The wheel or tire is then preferably readily removable.

Another object of the invention is to provide means whereby slippage between the inclined edge or face of the ramp and the projection of the brake drum or rim will be reduced or eliminated so that when the wheel is power rotated, as is the case in the rear wheel of a motor vehicle with rear drive, the power rotation of the wheel will make the extension of the rim or brake drum engage with the teeth on the ramp and give a positive drive during the raising operation.

When this ramp is used on front wheels of a rear wheel drive car the tractive power from the rear wheels will force the front wheel that is to be lifted up the ramp to the desired lifted position. Moving the car in the reverse direction with the rear wheel power will lower the lifted front wheel from the lifted position on the jack. With front wheel drive cars the rear wheels can be raised in the same manner as described for front wheel lift with rear wheel drive.

Other objects of this invention will be more particularly pointed out in the appended specification and claims.

I have illustrated my invention by way of example by way of the accompanying drawings in which:

Figure 1 is a perspective view of one form which the ramp might take.

Figure 2 is a side view in reduced scale showing the wheel of a vehicle lifted by a jack with some portions cut away and looking straight on to the wheel from the inside of the vehicle, taken at Sec. 2—2 of Figure 3.

Figure 3 is an end view of the wheel shown in the lifted position on the jack with the axle cut away.

Figure 4 is an enlarged view of a section of the brake drum and extension for receiving the ramp showing the construction of the wheel, brake drum and axle.

Figure 5 is a smaller scale view similar to Figure 3 showing the ramp engaging an extension over the brake drum rather than engaging the brake drum itself. This also is largely a cross section of a wheel and axle partly cut away.

In all figures, like numerals of reference refer to the corresponding parts.

In Figures 1, 2, 3 and 4, I have shown a ramp 11 which includes a ground supporting base 9 on which is rigidly mounted a vertical section 8, the upper edge of which has an inclined toothed ramp surface 12 which is terminated near the top by a recess 13 which is supposed to provide a stable resting place for the wheel drum or extension which rides up the ramp. A vehicle tire 10 is mounted on some suitable rim and wheel section such as 10a. The wheel section is preferably attached to the vehicle axle or to the hub 7 by some suitable fashion such as bolts 10b. A brake drum 15 is suitably secured to the vehicle hub 7 and preferably carries a projection 17 inside of the usual edge flange 15a. A brake shoe mounting plate 14 preferably carries the emergency brake cam 18 mounted on brake cam shaft 19 and operated by brake lever 20 through cable 25 and cable housing 22. A hydraulic hose 28 is connected to fitting 29 which, in turn, operates the service brakes on the car in the usual manner. The flange or projection 17 and outer flange 15a on the brake drum provide an inside and outside guide for the ramp 11 and this portion of the drum is preferably corrugated or teethed to mesh with the teeth 12 on the ramp so as to provide a positive drive between the brake drum and the ramp when the driven wheel is to be raised. On the front wheels where the wheel is raised by pushing it up the ramp by traction from the rear wheel which may be driven, the teeth on the brake drum may not be necessary and can be eliminated if desired.

In Figure 5, I have shown a slight modification in which extension 41 extends over the usual brake drum 42, the extension 41 being adapted to receive the ramp 30 which has a base 31. The vertical portion of the ramp in this instance has been bowed outwardly to provide more clearance for a vehicle tire particularly when the tire is flat during the raising operation.

I do not wish in any way to limit myself to the exact details or mode of operation set forth in this specification and drawings, for it will be obvious that wide departure may be made in the way of details without departing from the spirit and scope of my invention which is set forth in the following claims.

I claim as my invention:

1. A ramp-type jack for vehicles having ground engaging wheels, each wheel having a brake therefor of the conventional drum type, said jack comprising in combination: a pair of axially spaced radially extending annular flanges and a toothed guideway intermediate said flanges on the outer peripheral generally cylindrical surface of the portion of the brake drum that extends axially inwardly from the wheel beyond the plane of the inner radial face of the wheel with the teeth of said toothed guideway extending substantially radially from said cylindrical surface, and a ramp having a ground-supporting base and a generally vertically disposed section secured to said base, said section having an inclined upper toothed edge meshing with said toothed guideway, said inclined edge terminating at its upper end in an arcuate recess to support and retain said toothed guideway of the brake drum therein when said guideway has been driven up said ramp so that the wheel of the vehicle is in spaced relation to the ground.

2. The structure defined in claim 1, wherein said vertically disposed section of said ramp is offset intermediate its upper edge and said base, said offset portion providing clearance for the jack when used to raise a wheel of a vehicle having a deflated pneumatic tire thereon.

References Cited in the file of this patent
UNITED STATES PATENTS

| | | |
|---|---|---|
| 1,445,928 | Baker | Feb. 20, 1923 |
| 1,490,033 | Schornack | Apr. 8, 1924 |
| 2,177,042 | Michael | Oct. 24, 1939 |
| 2,203,774 | Cornelissen | June 11, 1940 |
| 2,533,869 | Barfus | Dec. 12, 1950 |

FOREIGN PATENTS

| | | |
|---|---|---|
| 923,243 | France | Feb. 17, 1947 |